(12) United States Patent
Paroz

(10) Patent No.: US 7,072,724 B2
(45) Date of Patent: Jul. 4, 2006

(54) METHOD FOR PROCESSING THE PARAMETERS OF A SPATIOTEMPORAL TRAJECTORY

(75) Inventor: Cedric Paroz, Saicourt (CH)

(73) Assignee: Tornos SA, Moutier (CH)

( * ) Notice: Subject to any disclaimer, the term of this patent is extended or adjusted under 35 U.S.C. 154(b) by 545 days.

(21) Appl. No.: 10/164,372

(22) Filed: Jun. 10, 2002

(65) Prior Publication Data

US 2002/0188356 A1 Dec. 12, 2002

(30) Foreign Application Priority Data

Jun. 11, 2001 (EP) ................................. 01810556

(51) Int. Cl.
*G05B 19/18* (2006.01)
(52) U.S. Cl. ........................ 700/63; 700/188; 700/186; 318/567; 702/141; 707/102
(58) Field of Classification Search .................. 700/63, 700/188; 702/141; 707/102; 318/567
See application file for complete search history.

(56) References Cited

U.S. PATENT DOCUMENTS

| 5,200,680 | A | | 4/1993 | Sasaki et al. | |
|---|---|---|---|---|---|
| 5,444,636 | A | * | 8/1995 | Yoshida et al. | 700/188 |
| 5,528,506 | A | * | 6/1996 | Yoshida et al. | 700/188 |
| 5,825,654 | A | | 10/1998 | Speth et al. | |
| 5,911,125 | A | * | 6/1999 | Fujibayashi et al. | 702/141 |
| 6,286,009 | B1 | * | 9/2001 | Mattioli et al. | 707/102 |

FOREIGN PATENT DOCUMENTS

| EP | 0 530 032 A2 | 3/1993 |
|---|---|---|
| EP | 0 544 346 A1 | 6/1993 |
| WO | WO 98 57240 A | 12/1998 |

OTHER PUBLICATIONS

Goto, Satoru, Nakamura, Masatoshi and Kyura, Nobuhiro, "Trajectory Generation of Industrial Mechatronic Systems to Achieve Accurate Contour Control Performance under Torque Saturation," Proceedings of the IEEE International Conference on Robotics and Automation, May 21, 1995, vol. 3, pp. 2401-2406.

* cited by examiner

*Primary Examiner*—Anthony Knight
*Assistant Examiner*—Sunray Chang
(74) *Attorney, Agent, or Firm*—Oliff & Berrdige, PLC

(57) ABSTRACT

Method for processing parameters of a spatiotemporal trajectory of movement of a moving body, this method being characterized in that: after having collected the data of the trajectory, the curvilinear abscissa (s) of the trajectory is calculated at least for the point of origin (A, B, C, . . . ) of each of its segments, and the result of the calculation of the curvilinear abscissa (s) of each point of origin of a segment is associated with at least one item of information relative to the desired speed of movement of the moving body over the segment in question; at least one predetermined law of acceleration (a(t)) is chosen, then that predetermined law of acceleration (a(t)) is applied to every instantaneous positive jump in speed, this in such a way as to associate with each positive jump in the desired speed (V) an expression of the speed in terms of the curvilinear abscissa, these data are stored, then the expressions of speed obtained are combined so as to obtain, for the whole trajectory, a single expression giving the final speed in terms of the curvilinear abscissa (s); successive intervals of time are defined and, for each of the intervals, the curvilinear path traveled from the starting point of the trajectory is calculated; for each of the intervals of time, the position of the moving body along each axis (X, Y) is extracted, in terms of the curvilinear path traveled; the positions of the moving body along each axis (X, Y) are stored, as a function of the time elapsed from the starting point of the trajectorys; these data are utilized to control the movement of the moving body on a machine that includes this moving body.

10 Claims, 2 Drawing Sheets

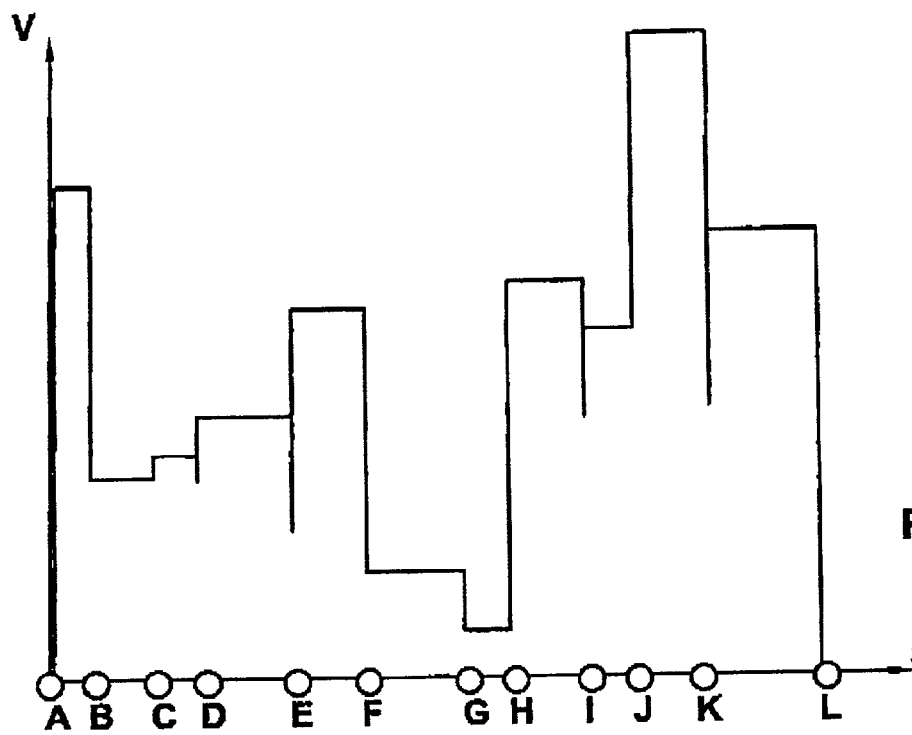
FIG. 3
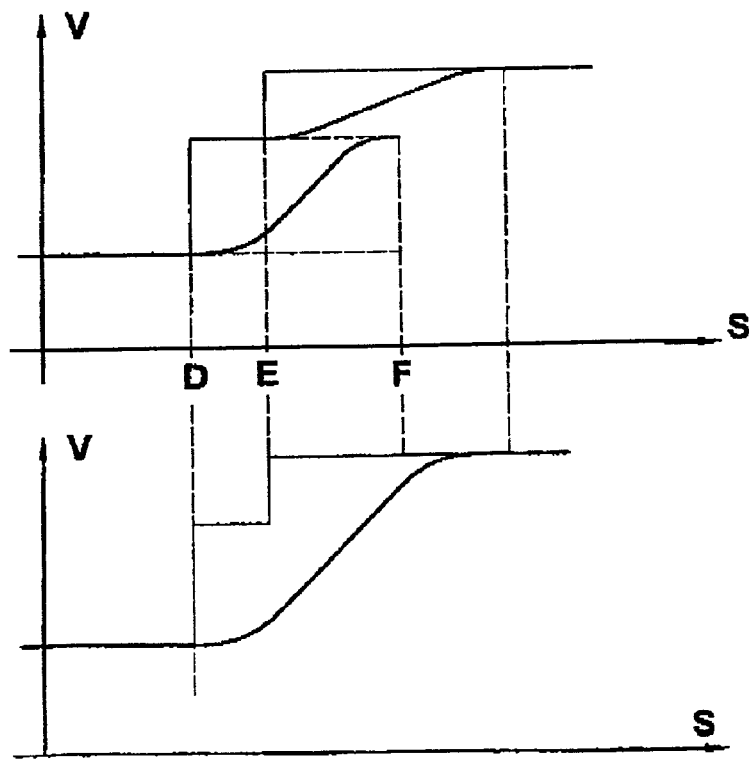
FIG. 4
FIG. 5

METHOD FOR PROCESSING THE PARAMETERS OF A SPATIOTEMPORAL TRAJECTORY

FIELD OF INVENTION

The invention relates to a method for processing the parameters of a spatiotemporal trajectory of movement of a moving body along at least one axis, allowing the shapes and limiting values of speeds and accelerations to be checked over this whole trajectory and for each axis.

The invention likewise relates to the parameters of movement of a moving body over a trajectory obtained at the conclusion of processing in accordance with the aforesaid method for processing trajectory parameters.

Likewise, the invention relates to the machine comprising at least one moving body intended to be moved over a spatiotemporal trajectory under the influence of at least one driving mechanism controlled by data obtained at the conclusion of processing in accordance with the aforesaid method for processing trajectory parameters.

BACKGROUND

Spatiotemporal trajectory designates the trajectory of movement of a moving body along at least one axis, this trajectory comprising at least one starting point and being made up of at least one segment, each segment being defined by parameters which determine at least
  the coordinates of its point of origin relative to a reference point situated on each axis,
  the length, as well as the shape and the geometric tolerance, accepted on the path defined by this segment,
  the value of the curvilinear speed of movement of the moving body which is desired on said segment.

SUMMARY OF INVENTION

The invention applies advantageously but is not limited to the processing of a tool trajectory used with a so-called numerically controlled machining apparatus.

One result which the invention aims at obtaining is a processing method which especially allows the movement times to be reduced by using the driving mechanisms of a machining apparatus in an optimum manner.

The optimum use of the driving mechanisms may be especially understood to be the use of the driving mechanisms to the maximum of their possibilities in comparison with that of the machine which comprises them.

For example, the term "driving mechanism" designates a rotary-type motor, the active element of which, i.e., the element from which a driving movement may be taken off, is driven rotatingly.

The term "driving mechanism" may likewise designate a linear-type motor, the active element of which, i.e., the element from which a driving movement may be taken off, is driven translatingly.

For the rest of the description, it is likewise considered that the term "characteristic called speed torque" of the driving mechanism represents the evolution of the force supplied by the active element of this driving mechanism in terms of its operating speed.

Methods for processing parameters of a trajectory in real time exist, but these methods give rise to unnecessary simplifications in the case of trajectories which can be recorded on media for this purpose in order not to be used until the opportune moment.

According to one of the methods for processing parameters of trajectories in real time, the acceleration curve obeys a second degree equation, parametered to have a maximum acceleration gradient.

When the speed to be attained is high, the processing reduces the acceleration gradient so that the maximum limit of acceleration (obtained for the maximum torque of a rotary-type driving mechanism) is not exceeded. The parameters of the curve are therefore calculated in order not to exceed this maximum acceleration. The resultant gradient is thus less than the gradient physically achievable.

The inventive processing method makes it possible to save time in getting up speed while respecting the limit of acceleration and the gradient limit.

The inventive method makes it possible to take into account, for example, the variation of the limit of acceleration in terms of the speed ("speed torque" characteristic).

The subject of the invention is therefore a method of the aforesaid type, especially characterized in that:
  the data of the trajectory, i.e., the parameters of each segment it includes, are collected, and
  the curvilinear abscissa of the trajectory is calculated at least for the point of origin of each segment comprised by this trajectory, i.e., when the trajectory comprises several successive segments, the sum of the lengths of the successive segments situated between said starting point of the trajectory and said point of origin of each segment it comprises is calculated, and
  the result of the calculation of the curvilinear abscissa of each point of origin of a segment is associated with at least one item of information relative to the desired speed of movement of the moving body over the segment in question, this in such a way that it is possible, on the one hand, to establish a graph representing the desired speed in terms of the total path traveled from the starting point of the trajectory and, on the other hand, to detect any instantaneous jump in the desired speed which is situated at least at the level of the point of origin of a segment,
  at least one predetermined law of acceleration is chosen which is so formulated that the application of this law of acceleration to any instantaneous jump in the desired speed results in gradually getting up speed beyond the point of origin of the segment in question, capable of extending over several segments, or even beyond the trajectory,
  said predetermined law of acceleration is applied to every instantaneous positive jump in speed present in the graph of the desired speed in terms of the curvilinear abscissa, this in such a way as to associate with each positive jump in the desired speed an expression of the speed in terms of the curvilinear abscissa, then these data are stored,
  the expressions of speed obtained are combined so as to obtain, for the whole trajectory, a single expression giving the final speed in terms of the curvilinear abscissa,
  successive intervals of time of predetermined value are defined and, for each of the successive intervals of time, the curvilinear path traveled from the starting point of the trajectory is calculated,
  for each of the intervals of time, the position of the moving body along each axis is extracted in terms of the curvilinear path traveled,
  the positions of said moving body along each axis are stored, as a function of the time elapsed from the starting point of the trajectory, these data are utilized to control the movement of said moving body on a machine comprising this moving body.

The subject of the invention is likewise:

the parameters of movement of a moving body over a trajectory, obtained at the conclusion of processing in accordance with the aforesaid method of processing trajectory parameters, the machine comprising at least one moving body intended to be moved over a spatiotemporal trajectory under the influence of at least one driving mechanism controlled by data obtained at the conclusion of processing in accordance with said method of processing trajectory parameters, aforesaid.

BRIEF DESCRIPTION OF THE DRAWINGS

The invention will be better understood upon reading the description which follows by way of non-limiting example, with reference to the enclosed drawing which shows by way of example.

DETAILED DESCRIPTION OF EMBODIMENTS

Figure 1:
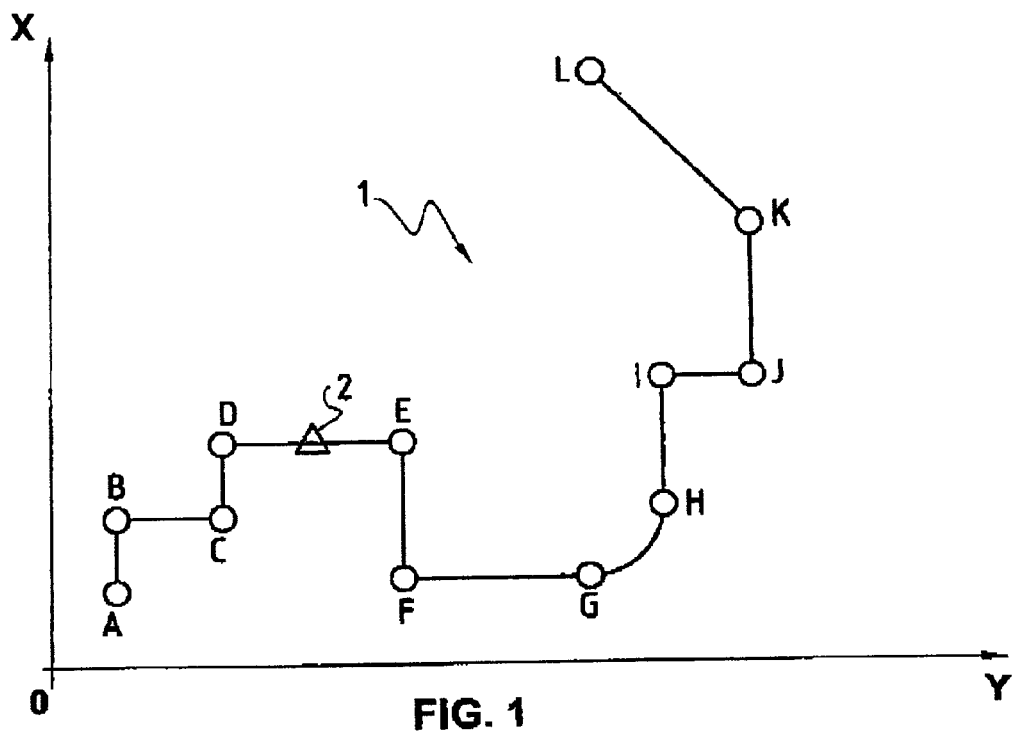
FIG. 1, a graph showing the trajectory of a moving body in a plane, this trajectory being made up of a plurality of segments, FIG. 2, a graph showing the trajectory of FIG. 1 and, associated at least with each of the points of origin of these segments, the curvilinear o abscissa of this point of origin, FIG. 3, a graph showing the desired speed over each segment in terms of the curvilinear abscissa, especially of the point of origin of each segment, FIG. 4, a graph showing, in terms of the curvilinear abscissa, the desired speeds associated with several segments, FIG. 5, a graph showing, in terms of the curvilinear abscissa, the desired speed which, associated with several segments, is obtained by combination of the expressions of the desired speeds associated with the segments of FIG. 4.
Figure 2:
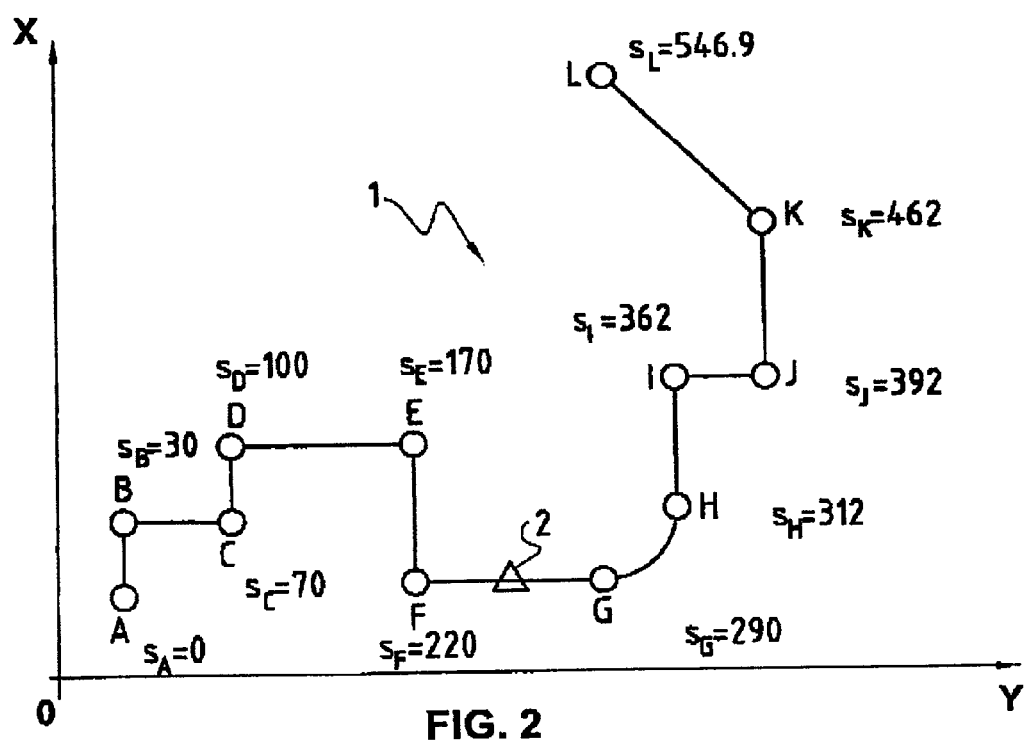

Referring to the drawing (FIGS. 1 and 2), a spatiotemporal trajectory 1 of movement of a moving body 2 (symbolized by a triangle) along at least one axis "X", "Y" is seen.

As this appears, the trajectory 1 comprises at least one starting point "A" and is made up of at least one segment "AB" and classically of several segments "AB", "BC", "CD", ". . .".

In the drawing, the various points "A", "B", "C", . . . of the trajectory have been symbolized by a circle.

Although this does not appear conspicuously in the drawing, each segment is defined by parameters which determine at least the coordinates of its point of origin "A", "B", "C", . . . relative to a reference point "0" situated on each axis "X", "Y", the length, as well as the shape and the geometric tolerance, accepted on the path defined by this segment, the value of the curvilinear speed of movement of the moving body (2) which is desired over said segment.

Remarkably, to carry out the processing of parameters according to the inventive method:

the data of the trajectory 1, i.e., the parameters of each segment it includes, are collected, and the curvilinear abscissa "s" of the trajectory 1 is calculated at least for the point of origin "A", "B", "C", . . . of each segment comprised by this trajectory 1, i.e., when the trajectory 1 comprises several successive segments "AB", "BC", "CD", . . . , the sum of the lengths of the successive segments situated between said starting point "A" of the trajectory 1 and said point of origin of each segment it comprises is calculated, and the result of the calculation of the curvilinear abscissa "s" of each point of origin of a segment is associated with at least one item of information relative to the desired speed "V" of movement of the moving body 2 over the segment in question, this in such a way that it is possible, on the one hand, to establish a graph representing the desired speed "V" in terms of the total path traveled from the starting point "A" of the trajectory 1 and, on the other hand, to detect any instantaneous jump in the desired speed "V" which is situated at least at the level of the point of origin of a segment, at least one predetermined law of acceleration "a(t)" is chosen which is so formulated that the application of this law of acceleration "a(t)" to any instantaneous jump in the desired speed "V" results in gradually getting up speed beyond the point of origin of the segment in question, capable of extending over several segments, or even beyond the trajectory, said predetermined law of acceleration "a(t)" is applied to every instantaneous positive jump in speed present in the graph of the desired speed "V" in terms of the curvilinear abscissa "s", this in such a way as to associate with each positive jump in the desired speed "V" an expression of the speed in terms of the curvilinear abscissa, then these data are stored, the expressions of speed obtained are combined so as to obtain, for the whole trajectory 1, a single expression giving the final speed in terms of the curvilinear abscissa "s", successive intervals of time of predetermined value are defined and, for each of the successive intervals of time, the curvilinear path traveled from the starting point "A" of the trajectory 1 is calculated, for each of the intervals of time, the position of the moving body 2 along each axis "X", "Y" is extracted in terms of the curvilinear path traveled, the positions of said moving body 2 along each axis "X", "Y" are stored, as a function of the time elapsed from the starting point of the trajectory 1, these data are utilized to control the movement of said moving body 2 on a machine comprising this moving body 2.

The aforesaid machine has not been shown, for it is not necessary to the understanding of the invention.

Still remarkably, at least before extracting the position data of the moving body 2 along each axis "X", "Y" as a function of the time, the processing of the parameters of the trajectory 1 is repeated, traveling over it from the end toward the beginning, i.e., taking as imaginary starting point of this trajectory 1 a point "L" which in fact constitutes the last point of said trajectory 1 and as point of origin of each segment, the last point of this segment, and calculating the total curvilinear distance separating each point of said trajectory from said imaginary starting point "L" and, at the time of this processing, considering each negative instantaneous jump in speed, i.e., each instantaneous jump which demands a negative acceleration, viz., a deceleration.

Still remarkably, at least the "speed torque" characteristic of a driving mechanism intended to move the moving body 2 over the trajectory 1 is taken into account, and to this end:

- said characteristic called "speed torque" of this driving mechanism is considered, i.e., the evolution of the force supplied by an active element of this driving mechanism in terms of its operating speed,
- in terms of the curvilinear abscissa "s", a correction factor is calculated dependent upon the "speed torque" characteristic so as to take into account variations of the force available on the active element of the driving mechanism, in terms of the desired speed "V" for the moving body "2",
- this correction factor is applied to the final speed before the step of extraction of the positions of the moving body "2" on each axis, in terms of the value of the curvilinear path traveled.

Just as remarkably, previous to the calculation step permitting the conversion of the data of the trajectory 1 into curvilinear coordinates, a search is made for possible complex non-linear segments of the trajectory, and they are converted into a succession of smaller segments of a given shape respecting the geometrical tolerance.

Knowing that, mathematically, in an X,Y system:

- a straight line is governed by a relation "y=f(x)" of the type
  "y"=(ax+b), i.e., an equation having two parameters (a and b),
- the curve of a circle with radius "R" is governed by a relation "y=f(x)" of the type
  "y"=$[(R^2-(x+X_o^2-Y_o]^{1/2}$, i.e., an equation having three parameters (R, $X_o$, and $Y_o$),
- the curve of a 3$^{rd}$ degree spline is governed by an equation "y=f(x)" of the type
  "y"=$axx^3+bxx^2+cxx+d$, i.e., an equation having four parameters (a, b, c, d),
- a segment of which the mathematical equation "y=f(x)" comprises more than a predetermined number of parameters is defined as a "complex non-linear segment," one skilled in the art being capable of fixing this predetermined number.

Advantageously and remarkably, the result of the calculation of the curvilinear abscissa "s" of each point of origin of a segment is associated with at least one other item of information which, as for it, is relative to the desired speed of movement "V" of the moving body 2 over the segment preceding the segment in question.

Equally advantageously and remarkably, the result of the calculation of the curvilinear abscissa "s" of each point of origin of a segment is associated with at least one other item of information which, as for it, is relative to the desired speed of movement "V" of the moving body 2 at said point of origin in question, in such a way as to respect a given geometric tolerance at said point of origin in question.

Specially remarkably, to calculate at a point "N" the curvilinear path traveled from the starting point of the trajectory, knowing:

- that to a given point "$s_N$" of the curvilinear abscissa of this trajectory, a final speed "$V(s_N)$" corresponds which may be used to calculate the length of the curvilinear movement traveled at this speed "$V(s_N)$" during an interval of time "Dt", and
- that at the conclusion of this movement, the moving body will be in a new curvilinear position "$s_N+D\ s_N$," to which a new final speed value "$V(s_N+D\ s_N)$" corresponds, this relation is used to calculate iteratively the new paths "D $s_N$" corresponding to the successive intervals of time "Dt".

In another specially remarkable manner, a law of acceleration is chosen which has the formulation:

$$a(t)=(Ao/2)[1-\cos(2\ Jo\ t/Ao)]$$

in which formulation

"cos" is the cosine,
"t" is the time,
"a(t)" is the value of the acceleration in terms of the time,
"Ao" is a predetermined maximum acceleration value, and
"Jo" is a predetermined maximum value of the derivative of the acceleration.

The invention claimed is:

1. Method for processing parameters of a spatiotemporal trajectory (1) of movement of a moving body (2) along at least one axis (X, Y), this trajectory (1) comprising at east one starting point (A) and being made up of at least one segment (AB, BC, CD, . . . ), each segment being defined by parameters which determine at least

- the coordinates of its point of origin (A, B, C, . . . ) relative to a reference point (0) situated on each axis (X, Y), the length, as well as the shape and the geometric tolerance, accepted on the path defined by this segment,
- the value of the curvilinear speed of movement of the moving body (2) which is desired over said segment, this method being characterized in that:
- the data of the trajectory (1), i.e., the parameters of each segment it includes, are collected, and
- the curvilinear abscissa (s) of the trajectory (1) is calculated at least for the point of origin (A, B, C, . . . ) of each segment comprised by this trajectory (1), and
- the result of the calculation of the curvilinear abscissa (s) of each point of origin of a segment is associated with at least one item of information relative to the desired speed (V) of movement of the moving body (2) over the segment in question, this in such a way that it is possible, on the one hand, to establish a graph representing the desired speed (V) in terms of the total path traveled from the starting point (A) of the trajectory (1) and, on the other hand, to detect any instantaneous jump in the desired speed (V) which is situated at least at the level of the point of origin of a segment,
- at least one predetermined law of acceleration (a(t)) is chosen which is so formulated that the application of this law of acceleration (a(t)) to any instantaneous jump in the desired speed (V) results in gradually getting up speed beyond the point of origin of the segment in question, capable of extending over several segments, or even beyond the trajectory,
- said predetermined law of acceleration (a(t)) is applied to every instantaneous positive jump in speed present in the graph of the desired speed (V) in terms of the curvilinear abscissa (s), this in such a way as to associate with each positive jump in the desired speed (V) an expression of the speed in terms of the curvilinear abscissa, then these data are stored,
- the expressions of speed obtained are combined so as to obtain, for the whole trajectory (1), a single expression giving the final speed in terms of the curvilinear abscissa (s),
- successive intervals of time of predetermined value are defined and, for each of the successive intervals of time, the curvilinear path traveled from the starting point (A) of the trajectory is calculated,
- for each of the intervals of time, the position of the moving body (2) along each axis (X, Y) is extracted in terms of the curvilinear path traveled, the positions of said moving body (2) along each axis (X, Y) are stored, as a function of the time elapsed from the starting point of the trajectory (1), these data are utilized to control the movement of said moving body (2) on a machine comprising this moving body (2).

2. Method for processing according to claim 1, characterized in that at least before extracting the position data of the moving body (2) along each axis (X, Y) as a function of the time, the processing of the parameters of the trajectory (1) is repeated, traveling over it from the end toward the beginning, i.e., taking as imaginary starting point of this trajectory (1) a point (L) which in fact constitutes the last point of said trajectory (1) and as point of origin of each segment, the last point of this segment, and calculating the total curvilinear distance separating each point of said trajectory from said imaginary starting point (L) and, at the time of this processing, considering each negative instantaneous jump in speed, i.e., each instantaneous jump which demands a negative acceleration, viz., a deceleration.

3. Method for processing according to the claim 1 or 2, characterized in that at least the "speed torque" characteristic of a driving mechanism intended to move the moving body (2) over the trajectory (1) is taken into account, and to this end:

said characteristic called "speed torque" of this driving mechanism is considered, i.e., the evolution of the force supplied by an active element of this driving mechanism in terms of its operating speed, in terms of the curvilinear abscissa (s), a correction factor is calculated dependent upon the "speed torque" characteristic so as to take into account variations of the force available on the active element of the driving mechanism, in terms of the desired speed (V) for the moving body (2), this correction factor is applied to the final speed before the step of extraction of the positions of the moving body (2) on each axis, in terms of the value of the curvilinear path traveled.

4. Method for processing according to one of the claims 1 to 3, characterized in that previous to the calculation step permitting the conversion of the data of the trajectory (1) into curvilinear coordinates, a search is made for possible complex non-linear segments of the trajectory, and they are converted into a succession of smaller segments of a given shape respecting the geometrical tolerance.

5. Method for processing according to one of the claims 1 to 4, characterized in that the result of the calculation of the curvilinear abscissa (s) of each point of origin of a segment is associated with at least one other item of information which, as for it, is relative to the desired speed of movement (V) of the moving body (2) over the segment preceding the segment in question.

6. Method for processing the result of the calculation of the curvilinear abscissa (s) of each point of origin of a segment is associated with at least one other item of information which, as for it, is relative to the desired speed of movement (V) of the moving body (2) at said point of origin in question, in such a way as to respect a given geometric tolerance at said point of origin in question.

7. Method for processing according to one of the claims 1 to 6, characterized in that to calculate at a point (N) the curvilinear path traveled from the starting point of the trajectory, knowing:

that to a given point ($s_N$) of the curvilinear abscissa of this trajectory, a final speed ($V(s_N)$) corresponds which may be used to calculate the length of the curvilinear movement traveled at this speed ($V(s_N)$) during an interval of time (Dt), and that at the conclusion of this movement, the moving body will be in a new curvilinear position ($s_N$+D $s_N$), to which a new final speed value ($V(s_N$+D $s_N)$) corresponds, this relation is used to calculate iteratively the new paths (D $s_N$) corresponding to the successive intervals of time (Dt).

8. Method for processing according to one of the claims 1 to 7, characterized in that a law of acceleration is chosen which has the formulation:

$$a(t)=(Ao/2)\times[1-\cos(2\times Jo\times t/Ao)]$$

in which formulation

"cos" is the cosine,

"t" is the time,

"a(t)" is the value of the acceleration in terms of the time,

"Ao" is a predetermined maximum acceleration value, and

"Jo" is a predetermined maximum value of the derivative of the acceleration.

9. Parameters of movement of a moving body (2) over a trajectory (1) obtained at the conclusion of processing in accordance with the method of processing which is the subject of any one of the claims 1 to 8.

10. Machine comprising at least one moving body (2) intended to be moved over a spatiotemporal trajectory (1) under the influence of at least one driving mechanism controlled by data obtained at the conclusion of processing in accordance with the method processing parameters of the trajectory (1) of this moving body (2), according to any one of the claims 1 to 8.

* * * * *